Oct. 24, 1972  L. E. PEARSON ET AL  3,700,512

METHOD OF FORMING A FLUID RETAINING WALL

Original Filed Feb. 14, 1967  3 Sheets-Sheet 1

LEE E. PEARSON &
JERI O. CLARK
INVENTORS

BY

ATTORNEYS

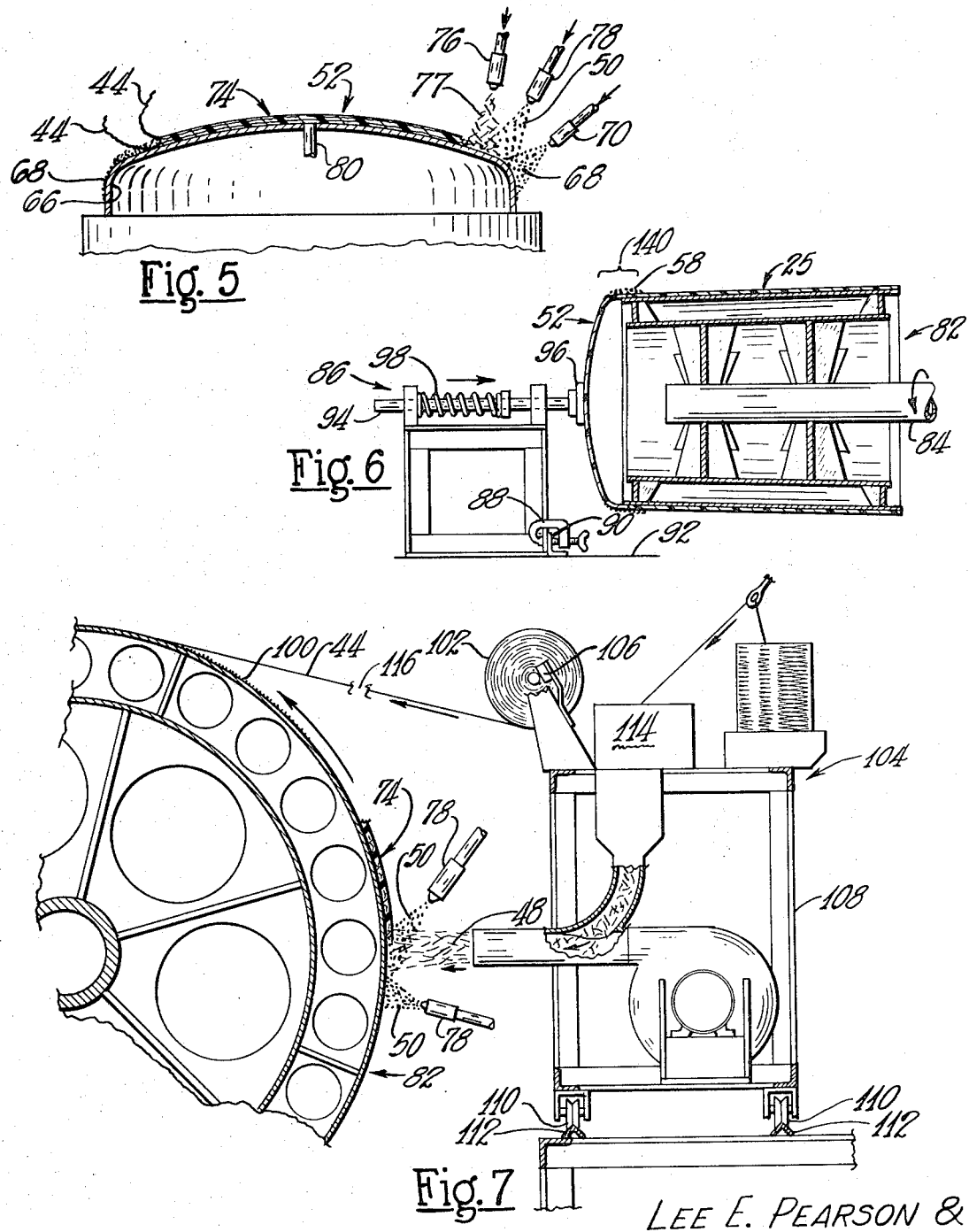

Oct. 24, 1972   L. E. PEARSON ET AL   3,700,512
METHOD OF FORMING A FLUID RETAINING WALL
Original Filed Feb. 14, 1967   3 Sheets-Sheet 3
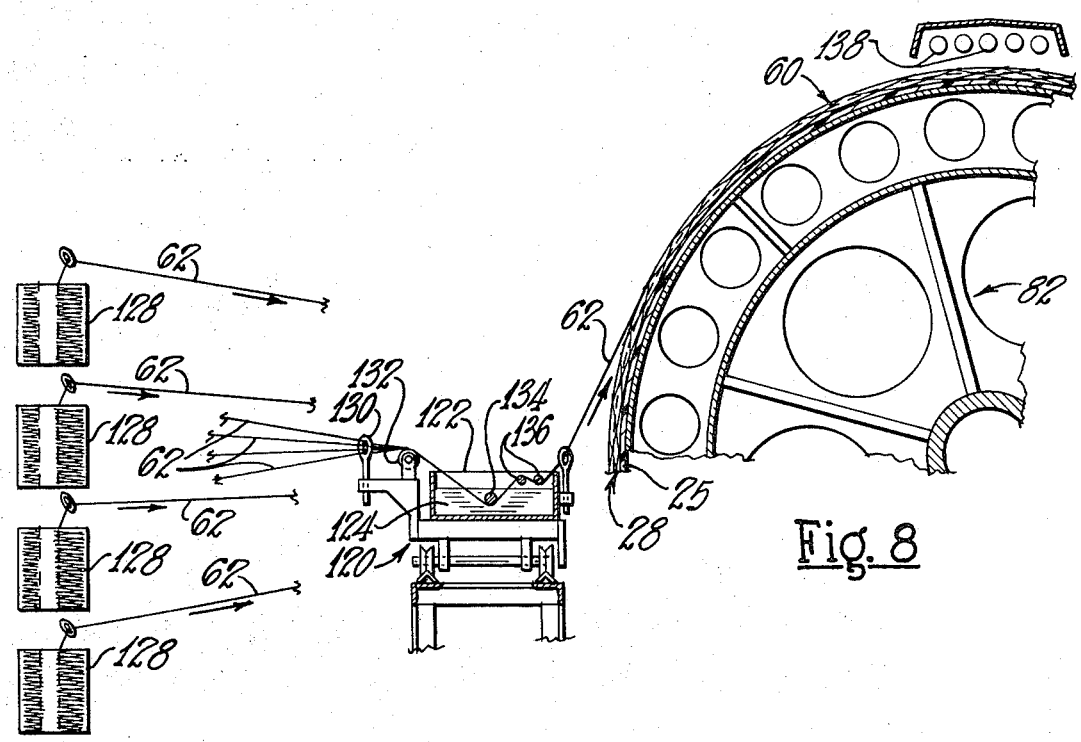
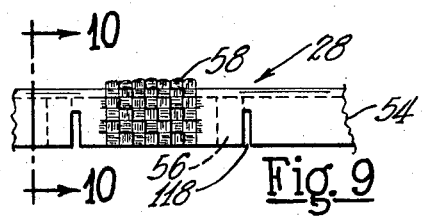
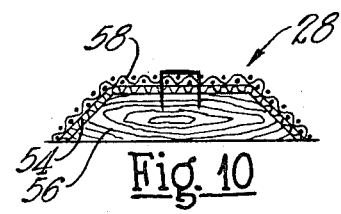
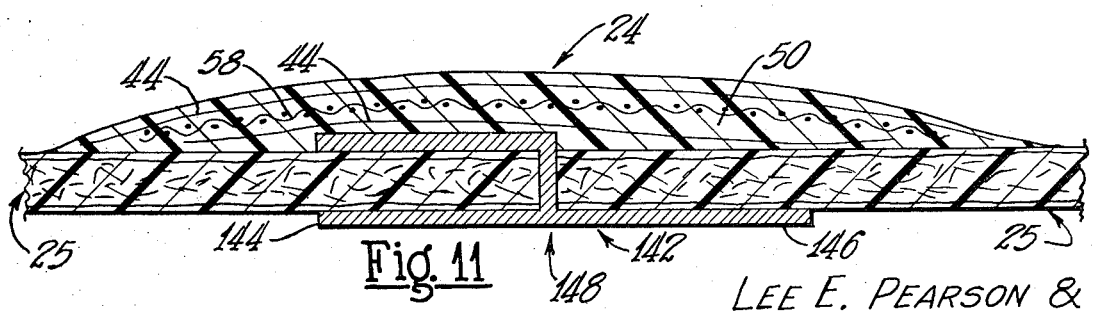
LEE E. PEARSON &
JERI O. CLARK
INVENTORS
BY
ATTORNEYS 3,700,512
METHOD OF FORMING A FLUID
RETAINING WALL
Lee E. Pearson, Newark, and Jeri O. Clark, Granville,
Ohio, assignors to Owens-Corning Fiberglas Corporation
Original application Feb. 14, 1967, Ser. No. 616,088.
Divided and this application Sept. 5, 1969, Ser.
No. 870,956
Int. Cl. B32b 17/04
U.S. Cl. 156—62.4
9 Claims

ABSTRACT OF THE DISCLOSURE

A composite wall of reinforced synthetic resin, for retaining both gases and liquids, that is particularly adapted for underground use in gasoline storage tanks, which are resistant to external compression forces; such as, water flooded earth. The wall is characterized by a very high stiffness factor, produced by a combination of spaced ribs of filament wound material and that are hollow, retained on top of a chopped strand-resin wall, where the chopped strand bridges the spaces between the ribs.

A process involving the steps of forming a tank end cap on a mandrel and thereafter supporting the end cap in space and laying up a resin-rich wall layer of chopped strand and resin in joined relation to the end cap, and curing the wall partially; then forming over the outer surface of the wall a hollow shell structure which comprises a combination of woven roving and filament wound layers superimposed and saturated with wet resin. Then completely curing the composite wall to produce a monolithic structure.

---

This is a division of co-pending application Ser. No. 616,088, filed Feb. 14, 1967.

This invention relates to a novel "alloy" or composite wall of reinforced synthetic resin, for retaining fluids; and, more particularly, to a composite wall embodying an unusually high corrosion resistance factor; and, still further, that embodies an unusually high stiffness factor so that it is unexpectedly resistant to external compression forces. Thus, the invention is particularly adapted for manufacturing underground gasoline storage tanks for use under all earth conditions.

The invention also relates to a method for producing the novel composite wall.

THE PROBLEM

Contamination of the soil, and water table beneath the surface of the soil in populated communities by gasoline and other petroleum products leaking from corroded underground iron storage tanks has risen to an alarming level. Though carbon steel tanks give reliable performance in many sections of the country, corrosive soil environments do present a serious problem in many other sections, particularly in the heavily populated eastern portion of the country. This is uniquely due to the fact that some of the most corrosive soils in the United States are found along the eastern seaboard and along the lower edge of the Great Lakes. These soil conditions seem to be particularly adverse to carbon steel tanks. The increasing human population naturally gives rise to an increasing automobile population. An increasing automobile population requires more service stations—with more underground storage tanks.

When, in a highly populated area, several underground storage tanks leak substantially before being detected, it is obvious that more than the mere cost of replacing the tanks is at stake. Undetected "leakers" have been known to release 20,000 gallons or more flamable fuel into the soil beneath a city. This is picked up and floated on the underground water table and is carried beneath the entire community. Two very substantial hazards are created as follows:

(1) Fire—Seepage of the floating fuel from crevices in the surface of the ground obviously presents a bad fire hazard. More particularly, the seepage of the fuel into the basement of a home or building presents an explosion hazard. Thus, a first threat arises against the safety and welfare of the population; and, (2) Contaminated water supply—The contaminated water supply factor is self-explanatory. Hydrocarbon products are poisonous for human consumption and, therefore, the vital water supply of a community can become endangered by underground gasoline storage tank leakage.

A very important factor, which though not arising to the gravity of the two hazards discussed above, is nonetheless so interrelated to the two hazards as to absolutely require consideration along with them.

This is the factor of tank replacement caused by soil corrosion failure. This actually produces hazards (1) and (2). Therefore, if this third factor could be brought under control, hazards (1) and (2) could be eliminated and thus the vicious cycle of fire and health hazard—and tank replacement could be stopped.

The key element in this cycle is corrosion which, when connected with underground stresses, causes tank failure.

Before explaining the manner in which these problems have been substantially eliminated by the present invention, however, a few further remarks about the tank replacement factor should be brought to light—in order to illustrate the manner in which the tank owner will also benefit. Thus, in certain harsh soil conditions, carbon steel tanks have been known to require replacement in as little as two years.

Thus, the oil company not only faces the contingency of repeated tank replacement, but also the contingency of watered gasoline being pumped into cars.

The replacement costs of a 6,000 gallon capacity gasoline tank made of carbon steel make the original cost seem incidental. Thus, locating the leaker presents a first substantial cost. Then, once the leaker has been located, the station driveway has to be torn up so that the old tank can be excavated. This includes the cutting of connecting pipes and so forth, all involving substantial expense. Thereafter, either repairing or replacing the old tank involves cost, along with reburying the old tank, including the expense of a lift crane, making pipe connections and then repaving the apron.

Further, the replacement costs of the tank do not reflect the loss of product, the loss of business and the loss of prestige for the company by the community.

Whether corroded, leaking tanks let water in or gasoline out, they can disrupt a whole community and its residents, a contingency oil companies cannot afford from either an economic or public relations point of view.

It is, therefore, evident that a novel underground storage tank for liquid hydrocarbon fuels, that is substantially corrosion-proof; that is highly resistant to distortions by all earth loading conditions; that does not contaminate stored fuels, among others, would provide a substantial advancement to the art.

Objects of the present invention are, therefore, to provide a novel fluid handling wall structure having the foregoing features.

A storage tank made by the present invention should prove substantially less expensive than steel tanks over the long term. The alloy design of the present invention forecasts a tank life of well over 20 years, even under adverse ground corrosion conditions. Thus, alleviation of the costs of replacement and the hazards enumerated above greatly favors the tank of the present invention.

As will become apparent from the following description, the wall of the present invention meets rigid tests for chemical inertness, abuse resistance, leakage, static and dynamic load bearing performance under flooded conditions, and fully meets standards of performance for an unequally supported tank as in faulty installation or wash-outs. These are all frequent causes of underground storage tank failure.

Other objects and advantages of the invention will appear in the following description and appended claims, reference being had to the accompanying drawings forming a part of this specification, wherein FIG. 1 is a top-plan view of an underground gasoline storage tank using the novel composite wall of the present invention; and, made by the method of the present invention;

FIG. 5 is a schematic sectional view showing tank end formation or lay-up;

FIG. 6 is a schematic view, partly in section, illustrating the manner in which an end cap is placed against the end of a mandrel 82, and is joined to an endless wall increment subsequently laid up on the outer surface of the mandrel;

FIG. 7 is a schematic view, partly in section, showing in greater detail the manner in which the side wall is laid up on the surface of a forming mandrel;

FIG. 8 is a schematic view, partly in section, showing the manner in which the ribs are applied to the wall and then covered with filament windings;

FIG. 9 is a fragmentary, side-elevational view of a rib;

FIG. 10 is a sectional view taken along the line 10—10 of FIG. 9; and,

FIG. 11 illustrates the manner in which two tank halves are welded at the center along the bracketed area 24, to produce the tank of FIG. 1.

By the present invention, a novel fluid handling wall is made from a glass-resin composite. Novelty resides particularly in the high stiffness factor imparted by the composite monolithic structure of the wall. Radial collapse forces, as in an earth buried condition, present a substantial challenge to the relatively low stiffness inherent in the usual glass reinforced resin laminate. By the present invention, unexpectedly high stiffness has been provided using a relatively low glass content, easily adequate, however, to surmount any tensile forces encountered.

It is unique in the method aspect of the present invention that a mobile chopped strand-resin system wall is autogenously "set" so that a stiffening rib can be filament wound on the outside and be retained up on top of the surface of the chopped strand-resin wall.

THE INVENTION EMBODIED IN AN UNDERGROUND STORAGE TANK

Figure 1:
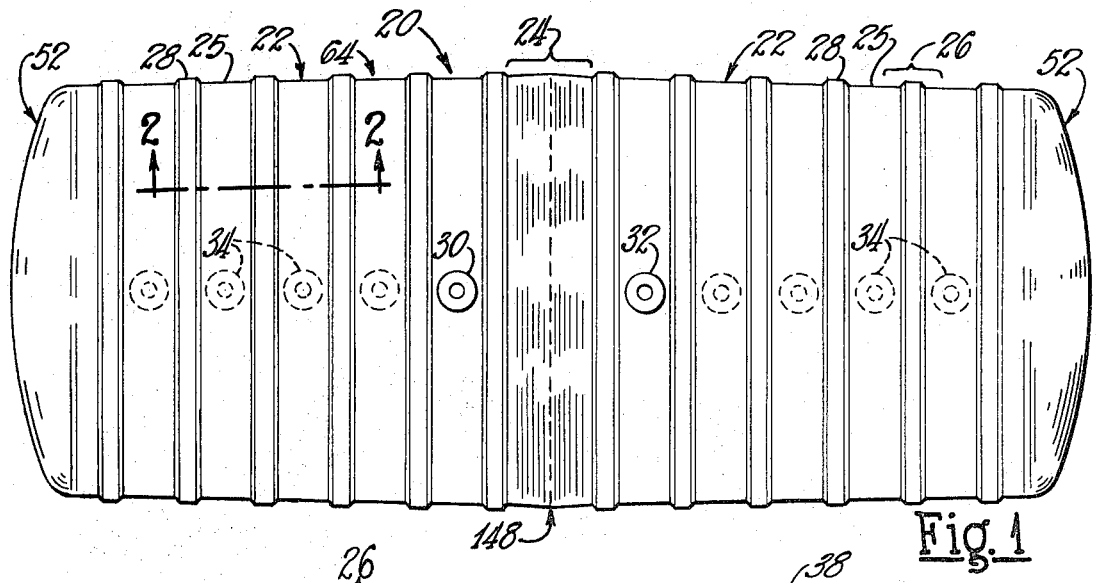

In FIG. 1, a tank 20 is shown, which employs the wall structure of the present invention and which is made by the method of the invention. This is an ideal application of the invention for resisting external crushing forces, such as an earth and flooded water overburden as often encountered by a buried gasoline storage tank. The tank 20 is made up of opposed frusto-conical tank halves 22, connected together by center joint 24. The novel "composite" wall 26 includes a wall element 25 in combination with a rib 28. Actually, a plurality of ribs 28 are axially spaced along the length of the tank 20. The specific structure of the "composite" wall in the area of each rib 28, will be described below. These ribs 28 extend peripherally of the tank 20 and act in the nature of strong hoops against radially inwardly crushing forces. Since they are of high tensile strength, they also absorb tensile stresses to which the tank 20 may be subjected. It is important to note that the ribs 28 unexpectedly add to the stiffness of the wall 25; also, they provide protective buffers during handling.

The ribs 28 are spaced apart a sufficient distance so that fill and vent fittings 30 and 32 can be installed between the ribs. Optional positions 34 for fittings are thus provided all along the length of the tank 20. In an actual 6,000 gallon capacity tank, of 8' nominal diameter, and approximately 20' length, a spacing of 16½" between rib centers was employed and this provided adequate space for the installation of the fittings 30 and 32.

Figure 2:
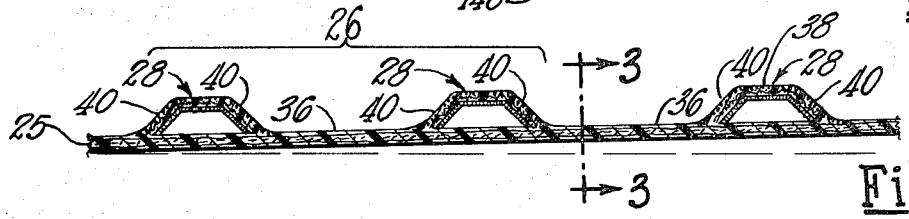
FIG. 2 is an enlarged sectional view, taken along the line 2—2 of FIG. 1.

The specific cross-sectional profile of the composite wall 26 is shown in greater detail in FIG. 2. Thus, there are valley sections 36 between each pair of spaced ribs 28. It is particularly important to note that the ribs 28 are of box-like cross section and are hollow forms. The rib profile includes a plateau 38 with sloping sides 40 extending down to the valley sections 36 on each side.

In this particular embodiment of the invention, the sides 40 slope at an angle of about 45°. However, this is not meant to be limiting and the broad scope of the invention is meant to encompass the hollow box form in the particular "alloy" or "composite" wall as herein described.

THE WALL AND VALLEY STRUCTURE IN GREATER DETAIL, FIG. 3

As resin-rich surface 42 is indicated on the inside of the wall element 25; and, comprises a thin layer of substantially pure isophthalic polyester resin. This is used in a gasoline storage tank because it is so resistant to either corrosion by or contamination of hydrocarbon fuel products. Since the isophthalic polyester resins are produced from petroleum derivatives, they are inherently resistant to gasoline and gasoline additives. This resin-rich surface layer 42 is held in place by a thin surfacing mat 44, made of lofted and bonded continuous glass fibers.

The central sectional portion 46 of the wall 25 is made up of chopped continuous glass strands 48 and isophthalic polyester resin 50, thoroughly admixed and bonded to one another. This is a resin-rich layer, meaning having a greater content of resin 50 than chopped strand 48. The purpose of the higher resin content is to impart stiffness and, thus, thickness to the wall 25. The lower proportion of chopped strand 48 is quite adequate, however, to impart necessary tensile strength to the wall 25, in combination with the ribs 28. The composite wall 26, therefore, readily withstands interior loading and other tensile stresses encountered in underground storage tank situations.

Figure 3:
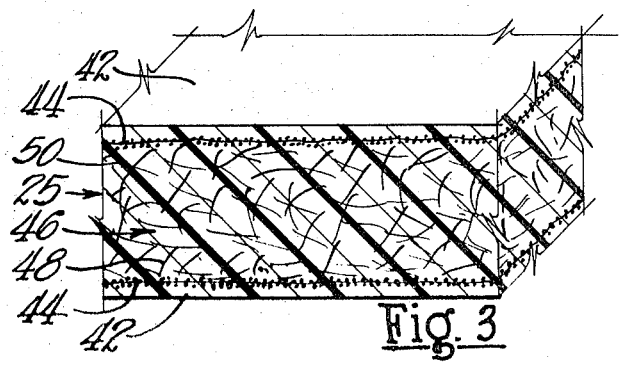
FIG. 3 is a greatly enlarged sectional view, taken along the line 3—3 of FIG. 2, showing a valley or wall section between the stiffening ribs.

As is meant to be conveyed by FIG. 3, the chopped strand segments 48 extend in random array and, thus, impart tensile strength in all directions. The wall 25 is thus both stiff and strong.

A resin-rich surface 42 is also indicated on the outside, similarly being held in place by a thin surface mat 44. The outer surface mat 42 is optional. The resin-rich surface 42 is highly resistant to the most corrosive soil conditions.

The end caps 52, FIG. 1, are also of this general construction. According to the description of the method hereinafter, the end caps 52 are made by spray lay-up technique and are fitted on the end of a forming mandrel and joined to the side wall 25 as the side wall is similarly laid up.

An important feature of the combination wall 25 of the present invention is that high stiffness is achieved with low glass content. This contributes substantially to a more economically competitive structure.

Stiffness increases at a rate 2.5 times thickness. Tensile modulus is not needed as much as stiffness in this construction. By comparison, stiffness bears only a 1:1 ratio to modulus. Therefore, an overlay of filament wound material, for example, is not nearly as efficient for stiffness increase.

THE RIB STRUCTURE

Figure 4:
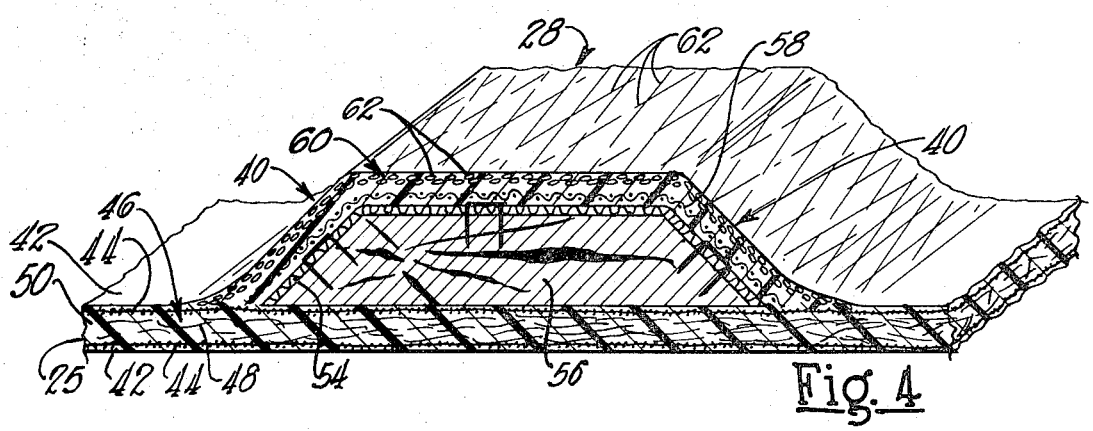
FIG. 4 is a perspective, sectional view of a rib area of the wall of the present invention, approximately actual size.

As shown in FIG. 4, the rib structure 28 is completely different from the main wall 25 and the valley structure 36, shown in FIG. 2. This rib structure 28 is formed or shaped over the wall 25, which is previously formed on the mandrel and is initially hardened. The two elements 25 and 28 are then cured completely to produce a monolithic structure, wherein they are effectively welded together. The rib 28 is supported in its hollow shape by a simple three-sided cardboard shell 54. Trapezoidal wood blocks 56 are positioned at spaced points along the length of the rib 28, to hold the cardboard shell 54 out from the wall 25. This preserves the hollow form of the rib 28. This is important in order to preserve high strength in the rib, and in the rib in combination with the wall element 25.

Over the cardboard 54, there is a layer of woven roving 58. Glass cloth also can be used, though more expensive. Then, over the woven roving layer 58, there is a layer of filament winding 60. This is made up of several thicknesses of continuous glass fiber strands 62 or rovings that are wound onto a tank half as it is rotated on a forming mandrel. This is explained in the method section of this specification.

Both the woven roving layer 58 and the filament wound layer 60 are saturated with the polyester resin 50 used in forming the side wall 25. Note that the filament wound layer 60 fans out somewhat from the lower edges of the ribs, and over the side wall 25 where the ribs 28 join the side wall. The filament wound layer 60 acts as a surfacing mat to hold a resin-rich surface 42 in place over the top of the ribs 28.

It will be noted that the rib 28 and side wall 25 are welded together into a monolithic structure even though they are formed in quick succession. Thus, the wall 25 is first laid up and initially set or hardened by a self-contained catalyst; then, the rib 28 is laid on over the top surface of the wall, and the filament winding 60 is applied. The initial set of the wall 25 keeps the rib 28 up on the top surface of the wall 25 during the filament winding operation. The filament winding "holds" the rib to the exterior of the wall 20. The ribs 28 are laid up with a heat-cure catalyst and are then thermally cured.

The thermal cure of the ribs produces a postcure of the side wall 25 and welds the units into a composite, completely monolithic structure.

Thus, the chopped strand-resin wall 25 bridges the spaces between the ribs 28, FIG. 1.

The rib 28 produces the action of a barrel hoop that is unexpectedly effective in resisting external crushing forces as encountered by the underground gasoline storage tank 20, as where a water-logged earth fill surrounds a buried tank. Tremendous crushing forces are present, and these are particularly severe when the tank 20 of FIG. 1 is empty and the wall 25 is thus not backed up by an incompressible liquid.

It is to be noted that the crush resistance of the composite wall 26 of the present invention is particularly resistant to oil canning. In order to hold a tank down under high water table conditions, steel straps are placed around each end and fastened to concrete piers. This prevents the tank from bursting out of the ground because of water pressure. High water conditions will tend to collapse the tank, if it is empty, by pushing up between the straps. Tanks made according to the present invention readily withstand such forces without rupture, and with very low distortion of the wall.

The composite wall of this invention, therefore, provides a substantial step forward in the art by using a chopped strand resin wall in combination with the filament wound and spaced hollow box ribs. Thus, the chopped strand resin wall 25 bridges the spaces between the ribs 28. Further, the chopped strand wall 25 forms the base of each rib, providing a unique combination. Only the ribs are filament wound and, thus, costs are greatly reduced while stiffness and modulus are unexpectedly increased.

Corrosion resistance and long life are advantageously built into the wall structure of the present invention by means of the media which hold the thin layer of protective resin to the exposed surfaces of the total composite.

Important features of the tank shape of FIG. 1, with its slight taper from each end, growing larger at the center, in addition to the features just described are as follows. A natural sump area is provided at the center, bottom, for the accumulation of any moisture entrained in the fuel stored in the tank. This also provides a natural high loading point at the center of the tank. A natural high point is also provided at the center for venting the tank. Further, a high suction point is provided near each end, that is away from and above the level of the central sump so that fuel can be removed from the the tank without withdrawing any moisture that collects in the sump area.

THE PROCESS

The basic unit made by the present process is a tank half 22. As shown in FIG. 1, this comprises an end cap 52 which is bonded to an endless frusto-conical wall segment 64 to form the tank half 22. The open ends of two tank halves 22 are welded at the area 24, FIG. 1, to produce the completed tank 20.

The manner in which the end caps 52 are made and joined to the circular side wall increment 64 and the manner in which the ribs 28 are put on the side wall 64 will now be described in detail.

END CAP MANUFACTURE, FIG. 5

A metal mandrel 66 is utilized for laying up the end cap 52. The mandrel 66 has an appropriate contour to shape the end cap. In this instance, for producing the tank of FIG. 1, the mandrel 66 is outwardly convex. A layer of release agent 68 is first applied from a gun 70 to the outer surface of the mandrel 66. The release agent 68 is suitably a wax or other to aid in removing the finished part from the polished surface of the mandrel 66.

A layer of surfacing mat 44 is next applied to hold a resin-rich surface on the inside of the end cap 52. Note FIG. 3 for this type of construction.

Next, there is applied by suitable means, a layer 74 of liquid resin and chopped strand reinforcement. One exemplary means for applying the chopped strand-resin layer 74 comprises a gun 76 that chops continuous glass fiber strands and propels the chopped pieces 77 toward the exterior surface of the mandrel 66. Simultaneously a gun 78 applies a surrounding mist of resin 50. The resin 50 wets the chopped strand 77 and together with the chopped strand, builds up the layer 74 over the surface mat 44 on the mandrel 66.

Also, on the outside there can be applied an optional layer of surface mat 44 in order to hold a resin-rich surface on the outside. See FIG. 3 for this type of construction. Application of the surface mats 44 is indicated schematically at the left, in order to keep FIG. 5 as clear as possible.

The resin 50 applied by the gun 78 contains the catalysts. The resin is, therefore, self-curing.

Removal of the part from the mandrel 66 is suitably affected by lifting off. If desired, an assist from a jet of air, introduced by a built-in conduit 80, can be used.

The process steps that arise from the prior description include the following:

(1) Coating a forming mandrel with a release agent;
(2) Applying surface mat and resin-rich coating;
(3) Applying a chopped strand and resin lay-up of appropriate thickness;
(4) Applying optional surface mat, and resin-rich coating;
(5) Curing the resin to a solid, handleable condition; and,
(6) Stripping the end cap from the mandrel.

This produces a cap 52 that will fit onto the end of a forming mandrel 82, FIG. 6, used in making the endless frusto-conical side wall increment 64 of FIG. 1.

THE SIDE WALL PROCESS, FIGS. 6 AND 7

As shown in FIG. 6, a rotatable mandrel is designated 82. This is a hollow, open-ended, frustoconical shell. The slight taper provides part release. Thus, the completed unit can be slid off the small end. The mandrel 82 is supported in a suitable manner for rotation on the central support shaft 84. The shaft 84 is cantilevered so that the left end of the mandrel 82 is exposed for application of the end cap 52, from FIG. 5.

As shown in FIG. 6, the end cap 52 is held in position at the end of the mandrel 82 by means of a dead-center mechanism 86. The dead-center mechanism 86 is held in place by any suitable means. For example, a clamp 88 can be used to hold a leg of the mechanism 86 to an angle iron 90 fastened to the floor 92.

A dead-center mechanism 86 includes a rotatable shaft 94 having a rubber pad 96 at one end, which abuts the tank end cap 52. A spring 98 urges the shaft 94 in a direction to force the rubber pad 96 against the end cap 52 and firmly holds the end cap in position on the end of the mandrel 82.

As shown in FIG. 6, a layer of wall 25, FIG. 3, has been applied to cover the surface of the mandrel 82 and is coupled with the end cap 52 during the process. The manner in which this is done is more specifically described by reference to FIG. 7.

Thus, as shown in FIG. 7, a layer of release agent 100 is first applied to the mandrel 82 by suitable means. This is shown schematically since release agents are known in the art. The end cap 52, FIG. 6, is then pushed into position at the end of the mandrel 82 as shown in FIG. 6. A layer of surfacing mat 44 is then applied, FIG. 7. Thereafter, a layer 74 of resin and chopped strand is built up on the outside of the mandrel 82. This is of substantially the same thickness as that of the end cap 52. Then, a top surfacing mat layer 44 is applied. The complete lay-up thus comprises the following components as shown in FIG. 3:

A resin-rich inner surface 42, next to the mandrel 82, applied after a suitable release agent has been applied to the mandrel;
An inner surface mat 44;
A central zone 46, 74 in FIG. 7, of chopped strand and resin; thus, a resin-rich layer for stiffness;
An optional outer surface mat 44; and,
A resin-rich outer layer 42.

As shown by further reference to FIG. 7, the resin 50 is applied to the coated surface of the mandrel 82 by the gun 78, as a layer of surfacing mat 44 is wound on from a roll 102, supported from the frame of the chopped strand and resin application apparatus 104. Appropriate tension is provided by a brake 106.

The resin application apparatus 104 includes a carriage 108 supported by rollers 110 on tracks 112 that extend along the side of the mandrel 82, parallel to the axis of the mandrel. The carriage 108 supports several resin guns 78, a roving chopper 114 and the surfacing mat roll 102.

The carriage 108 is moved back and forth along the tracks 112 by a traverser, not shown, in an ordered manner in order to apply the various components.

Next, then, the strand chopper 114 and the resin gun 78 apply the central zone 74 of chopped strand 48 and resin 50. The resin 50 contains catalyst and, thus, the resin system begins to cure as soon as it is applied; and, only enough catalyst is used to cause the resin to initially set to a firm or immobile condition.

After the layer of chopped strand and resin 74 is built up to a sufficient thickness, an optional outer layer 44 of surfacing mat is applied and is saturated with appropriate resin to produce the resin-rich surface 42 as shown in FIG. 3.

The break 116 in the surface mat 44, shown in FIG. 7, indicates that the mat application may be discontinued between the inner and outer surfaces of the resin layer 74.

APPLICATION OF THE RIBS 28, FIG. 8

After the wall 25, FIG. 3, is built up in the manner shown in FIG. 7, it is permitted to cure to a sufficiently firm condition to support the ribs 28, FIG. 8, without movement. Then, the ribs 28 are applied as shown in FIG. 8. Each of the ribs 28 is supplied to the machine operator as a long strip of material of the nature of the fragmentary showing of FIG. 9. Each rib 28 is long enough to reach around the wall layer 74, previously formed as shown in FIG. 7, on the mandrel 82, and the ends are abutted and temporarily secured.

As shown in FIGS. 9 and 10, a rib 28 includes an elongated piece of cardboard 54 that is slotted at 118 at spaced points to permit it to flex and wrap around the mandrel 82. A long strip of woven roving 58 is tacked over the rib, through to the trapezoidal wood blocks 56, positioned underneath. This makes the rib strip a coherent unit for placing all the way around the tank.

The trapezoidal wood blocks 56, also shown in FIG. 4, establish and retain the appropriate cross-sectional form of the ribs 28.

After the ribs 28 are temporarily secured around the wall layer 25, a filament wound layer 60 is applied as shown in FIG. 8. A traversing carriage 120 is movable back and forth parallel to the axis of the mandrel 82. The carriage supports a pan 122 containing a body of liquid resin 124. The carriage 120 may include one resin pan 122 for each rib 28 applied. Referring to FIG. 1, this would amount to six (6) resin pans for the six (6) ribs on each half 22 of the tank 20.

The rovings 62, made of continuous glass fibers, are fed from suitably located packages 128 to an eye 130 and guide roll 132 and thence under a dip roll 134 to be immersed in liquid resin 124. As the wet rovings 62 then pass between wiper bars 136, the amount of resin is reduced to a desirable level.

As the mandrel 82, carrying the preformed ribs 28 is turned, the traversing carriage 120 is moved to and fro parallel to the axis of the mandrel. This is effective to lay the wetted rovings 62 on the outer surface of the ribs 28 as shown in FIG. 4. Note the slight angular, or back and forth lay of the rovings 62 in FIG. 4. The rovings 62 also lap over slightly onto the wall 25, FIG. 4, to provide a complete bond between the rib 28 and the wall.

Due to the traverse of the wetted rovings 62 back and forth over the ribs 28, the orientation of the rovings is both axial and peripheral. This imparts strength in both axial and peripheral directions to the tank. Additionally, the criss-cross lay of the rovings produces a very high strength shell structure, stress-resistant in all directions. Still further, the fabric layers 58, FIG. 4, positioned beneath the filament wound rovings 62, provides high transverse strength to the ribs and this, in turn, is synergistically combined with the stiffness and strength of the wall 25 in a composite monolithic structure.

Additionally, the traverser of the carriage 120 is adjusted to lay the rovings 62 carefully along the sloping sides 40 of the ribs 28 as shown in FIG. 4. Care is exercised in getting this orientation quite exact in order to provide a smooth contour over the ribs 28. Control at this point is provided by the radiants 138, FIG. 8, which produce heat to gel the resin substantially as rapidly as the continuous strand rovings 62 are applied.

As the rovings 62 are wound on, they compact the woven roving layer 58, FIG. 4, gently down onto the cardboard shell 54, FIGS. 4, 9 and 10, and effectively drive out all gas. This renders the rib shell highly coherent.

It should be understood at this point, however, that the rovings 62 for the filament winding operation shown in FIG. 8 are not in a condition that can actually be called "tension." The condition is more aptly described as "oriented." Thus, the continous rovings 62 are applied with just enough drag by the wiper bars 136 in the resin pan 124 to "lay them on." This is sufficient to expel entrained gases and render the composite structure truly monolithic in character. Further, the rovings are ready to instantly assume load, but do not impart a prestressed condition to the composite body.

The combination of hollow form ribs is two-fold:

(1) The peripheral orientation provides great radial strength; and,
(2) The axial traverse of the rovings 62 provides great axial strength.

Therefore, the combination provides both radial and axial strengths; and, these include stiffness and tensile strength to meet all conditions encountered by the tank under consideration.

THE END CAP OVERLAY

Referring back to FIG. 6, it will be understood that there is at least a hypothetical line joint between the end cap 52 and the side wall 25, because the wall is laid fresh against the previously partially cured end cap. Although the resins will theoretically cure together, added strength along the bend area 140 is provided by adding a strip of reinforcement 58. This is saturated with resin and cured. The result is a very strong monolithic structure with all of the resin cured together and strongly reinforced.

THE FINAL CURE

This is now the point where the entire lay up is cured to a hard solid state to thereby produce a monolithic composite. This is effected by means of the radiants 138 in FIG. 8. When these are turned on they radiate heat against the lay-up; and, with the mandrel 82 turning, the lay-up is heated evenly and uniformly. This post-cures the resin layer 25 and also fully cures the resin contained in the ribs 28, and the resin applied to the area 140 in FIG. 6, at the joint between the end cap 52 and the wall portion 25.

THE MONOLITHIC RESULT

It might be stated by way of comparison to prior processes known in the art, that it is known to first gel a chopped strand layer before covering directly with a filament wound layer. There has been some doubt that the two layers would weld into a monolithic structure. However, in the present invention, the wall 25 is catalytically set only to a sufficient hardness to hold or support the rib 28 in position during the formation of the rib and keep the rib from being forced down into the wall 25 and displacing adjacent portions of the wall. The rib 28 is then wound on using wet resin which wets readily to the wall 25.

Thereafter, the ribs 28 are cured by means of the radiants 138, shown in FIG. 8. This not only fully cures and post-cures the resin in the ribs, but also postcures the resin of the wall 25. This very effectively produces a truly monolithic wall structure.

The final unit, therefore, is of monolithic character, yet displays a synergistic blend or combination of the unique stiffness and high tensile properties of the composite structure wherein the most far-reaching importance in the performance is the effect produced by the interaction of the properties of the constituents. The resin-rich wall 25 provides great stiffness in its own right. The box-like form of the ribs with filament winding over the top provides very high tensile and also imparts a high degree of stiffness. Thus, the rib overlay in combination with the stiff wall 25 beneath, provides a unique monolithic composite body that is light in weight yet of very high rigidity and strength. Note that there are dissimilar materials opposing each other in this structure.

By the present invention, the contribution of each constituent is independently acting relative to the other components. Thus, each constituent complements the other by contributing separate and distinct properties. Thus, the combination tank wall has radial crush resistance imparted by the rigid box ribs and also by the stiffness of the wall 25; further, the ribs impart high tensile strength. This brings out the fact that the properties of the constituents also supplement one another; the component properties are clearly higher than those of the constituent parts.

It is to be emphasized that the combination rib, in combination with the stiff wall, presented substantial novelty in accordance with this invention.

THE CENTER JOINT

To assemble a complete tank as shown in FIG. 1, the open ends of the two tank halves 22, made as just described, are butted together and welded in the manner shown in FIG. 11. In one preferred method of center joining in accordance with the invention, metal clips 142 are used. These include a U-shaped half 144 that fits over the open end edge of one of the tank halves. The other half comprises a strap 146 to slip inside the other tank half, thus holding it out to the contour of the first tank half.

With a plurality of these clips in place around the center, a layer of mat 44 is placed over the joint, followed by alternate layers of woven roving 58 and mat 44, all being saturated with the catalyzed resin 50.

Since the clips 142 are buried in the resin 50, they are protected against corrosion.

The various layers of mat 44 and roving 58 are offset, to spread the weld or center joint 24 over a substantial area on each side of the abutment line 148. This is shown clearly by the bracket 24 in FIG. 1. This wide weld distributes stresses; and, further, thickness is sufficient to provide a fluid-proof seal.

SUMMARY OF THE SIDE WALL PROCESS

The following method steps are inherent from the prior description, for the production of the composite wall of the present invention:

(1) Laying up or forming a resin-rich wall layer of chopped strand and resin; the resin containing sufficient catalyst to "set" the layer whereby it will support the subsequent rib formation. Resin-rich surfaces are provided for the wall for corrosion resistance;

(2) Forming over one surface of said wall layer, a hollow shell rib, using the wall layer as the base, for stiffness, and the rib shell comprising a combination of woven roving and filament wound layers, superimposed and saturated with set resin. Any suitable hollow shape or form, such as the cardboard illustrated, can be used to support the wet rib at this stage. It is important that the filament winding layer extend predominantly peripherally of the rib, with some axial traverse;

(3) Completely curing the composite wall to produce a monolithic structure.

TANK PRODUCTION

For the production of a tank, tank halves 22, FIG. 1, are formed by the steps of molding an end cap in the nature of the resin-rich wall 25 of FIG. 3, and joining this to a frusto-conical wall segment 64, made by Steps 1 and 2 above. Then, two tank halves are butt joined to complete the tank.

The effectiveness of storage tanks made by the present invention in withstanding actual use conditions include the following:

Four inch (4") pipe flanges were installed at the positions 30 and 32 in FIG. 1. These were carefully bonded to the wall. With the tank half buried, a torque of 3,300 pounds was applied without failure of the fitting or wall. Also, the fitting and wall withstood 400 pound load applied to the end of a 5' section of pipe installed in the fitting. The tank was checked for leakage before and after the test. There was none.

The tank was installed in a pit on a sand bed and covered with sand to a depth of 3' above the top. The sand was tamped in place. There was no damage to the tank.

In a very severe test, the tank was supported at each end and placed over a 3' void at the center. Thus, it was unequally supported at the bottom. Under buried conditions, and filled with water, there was no damage and maximum deflection was ½" in the side wall. When the test was reversed with the support in the center and the voids at each end, there was no damage and maximum deflection of the side wall was $3/32''$.

In an external hydrostatic pressure test, an empty tank was strapped down at the ends and buried in tamped sand, then flooded to 3' above the top. There was no failure and maximum deflection was $25/32''$.

The tank that withstood the foregoing test was checked for leakage by using compressed air 5 p.s.i.g., and soap solution around the fittings. There was no evidence of leakage.

In a drop test, an empty tank was dropped 2' onto a road surface. There was no protection. The only indication of the test was some whitening of the ribs at the point of impact, indicating slight delamination. However, there was no evidence of damage to the shell. Thus, the ribs provided an extremely high strength buffer, protecting the inner shell and retaining it fluid-proof.

The tank that was dropped was also tested, without repairing the rib damage, to 25 p.s.i.g. gas pressure. This is five times the normal loading factor. The tank safely contained the pressure buildup.

Immersion tests using cut sections of the tank wall were conducted using various acids, bases and fuels. These were extremely harsh tests conducted at 100° F. At the end of six months there was more than 50% of original tensile, flexural and Izod impact strength retained in every instance. Test liquids included 5% NaOH, 20% $H_2SO_4$, 5% $HNO_3$, gasoline, toluene, benzene, etc., indicating the harshness of the tests.

Visual examination showed some discoloration, but there was no indication of fiber bloom or crazing.

The immersion and aging tests showed that the tank wall resisted the action of the stored product and surrounding soil conditions.

What is claimed is:

1. In a method of producing a composite, monolithic wall, the steps of applying onto a moving surface a mixture consisting essentially of predominantly hardenable matrix material and discrete lengths of line-type reinforcement materials suspended therein, partially hardening said matrix material to a self-sustaining state to hold said layer against movement relative to said moving surface, superimposing a rib form on the exposed surface of said layer, applying to said rib form essentially the same mixture as was applied to said moving surface, partially hardening the matrix material on said rib form to a firm state to retain the mixture in place on said rib form against movement relative to said form, circumscribing said rib form and the material thereon with continuous filament reinforcement material arranged in a layer, said material being impregnated with additional hardenable matrix, and finally simultaneously curing into an integral monolithic mass the resin of (1) the mixture applied to said moving surface, (2) the mixture applied to said rib form, and (3) the matrix impregnating said filament reinforcement material.

2. The invention according to claim 1 wherein the discrete lengths of line-type reinforcement material consist of chopped glass strands, and the continuous filament reinforcement material consists of continuous glass fibers.

3. The invention according to claim 1 including overlaying said rib form with a first layer of woven continuous reinforcement material, having part of the filaments extending in the direction of the rib form, and then laying on top of said first layer, a second layer consisting of continuous filament reinforcement extending predominately in the direction of the rib form, and laying on said continuous reinforcement in a manner to compact and degas the two layers, and substantially without tension in the continuous filaments in the unstressed condition of the composite wall.

4. The invention according to claim 3 wherein the discrete lengths of line-type reinforcement material consist of chopped glass strands, and the continuous filament reinforcement consists of continuous glass fibers, and the matrix is a polyester resin.

5. In a method of producing a tank or the like for retaining a fluid, the steps of rotating an essentially cylindrical surface about a longitudinal axis, spraying from a spraying apparatus and onto the surface a mixture consisting essentially of predominantly hardenable matrix material and discrete lengths of line-reinforcement materials suspended therein, relatively moving said surface and said apparatus axially of said surface while rotating the surface to apply a layer of matrix material and admixed reinforcement material onto the cylindrical surface, superimposing on said layer a plurality of rib forms each of which circumscribes the surface and the layer applied thereto, applying to each of said rib forms essentially the same mixture as was applied to said mandrel to form an initial layer, rotating the surface while circumscribing each of said rib forms and the mixture thereon with continuous filament reinforcement material arranged in a layer while leaving exposed said earlier applied layer on said surface and extending between the spaced rib form, the continuous filament reinforcement material being impregnated with additional hardenable matrix, and finally, completely hardening into an integral monolithic mass, including the continuous filament reinforcement material, the matrix material of (1) the layer applied to the mandrel, (2) the matrix material sprayed onto said hollow rib forms, and (3) the additional hardenable matrix impregnating the continuous filament reinforcement material.

6. The invention according to claim 5 wherein the discrete lengths of line-type reinforcement material consist of chopped glass strands, the continuous filament reinforcement material consists of continuous glass fibers, and the hardenable matrix is a polyester resin.

7. The invention according to claim 5 including overlaying said rib form with a first layer of woven continuous reinforcement material, having part of the filaments extending in the direction of the rib form and part of the filaments extending transversely of the rib form, and then laying on top of said first layer, a second layer consisting of continuous filament reinforcement extending predominately in the direction of the rib form, and laying on said continuous reinforcement in a manner to compact and degas the two layers, and substantially without tension in the continuous filaments in the unstressed condition of the composite wall.

8. The invention according to claim 7 wherein the discrete lengths of line-type reinforcement material consist of chopped glass strands, and the continuous filament reinforcement consists of continuous glass fibers, and the matrix is a polyester resin.

9. The invention according to claim 5 including abutting the open ends of two so-formed tank halves, by holding the open end of one by the open end of the other and to the attitude of the other, and then overlaying the line of abutment with alternate layers of mat and woven roving spanning the abutment line and being embedded in a hardened resin matrix.

References Cited

UNITED STATES PATENTS

| | | | |
|---|---|---|---|
| 2,858,992 | 11/1958 | Wentz | 156—172 |
| 3,047,191 | 7/1962 | Young | 156—173 UX |
| 3,215,576 | 11/1965 | Huff | 156—171 X |
| 3,412,891 | 11/1968 | Bastone et al. | 156—171 X |
| 3,457,963 | 7/1969 | Hardwick | 156—172 X |

E. E. LEHMANN, Assistant Examiner

CARL D. QUARFORTH, Primary Examiner

U.S. Cl. X.R.

156—171, 172, 173, 296; 220—5